United States Patent
Tsuji

(10) Patent No.: US 7,760,088 B2
(45) Date of Patent: Jul. 20, 2010

(54) INTRUSION DETECTION SENSOR

(75) Inventor: Masatoshi Tsuji, Otsu (JP)

(73) Assignee: Optex Co., Ltd., Shiga (JP)

( * ) Notice: Subject to any disclaimer, the term of this patent is extended or adjusted under 35 U.S.C. 154(b) by 411 days.

(21) Appl. No.: 11/922,473

(22) PCT Filed: Jun. 22, 2006

(86) PCT No.: PCT/JP2006/312493

§ 371 (c)(1),
(2), (4) Date: Dec. 19, 2007

(87) PCT Pub. No.: WO2006/137477

PCT Pub. Date: Dec. 28, 2006

(65) Prior Publication Data

US 2009/0079563 A1  Mar. 26, 2009

(30) Foreign Application Priority Data

Jun. 24, 2005  (JP) ............... 2005-184661

(51) Int. Cl.
*G08B 13/18* (2006.01)
(52) U.S. Cl. ............. 340/552; 340/541; 340/554; 342/107; 342/28; 342/90
(58) Field of Classification Search ............ 340/552, 340/541, 554; 342/107, 28, 90, 174, 114, 342/173, 104, 115, 106, 68, 189, 162, 195, 342/157, 158
See application file for complete search history.

(56) References Cited

U.S. PATENT DOCUMENTS 3,781,773 A * 12/1973 Ravas .................... 367/94
6,859,164 B2 * 2/2005 Kurita et al. ............ 342/28

(Continued)

FOREIGN PATENT DOCUMENTS

JP  07-029076  1/1995

(Continued)

OTHER PUBLICATIONS

International Preliminary Report on Patentability mailed Jan. 10, 2008 for International (PCT) Application PCT/JP2006/312493.

(Continued)

*Primary Examiner*—Davetta W Goins
*Assistant Examiner*—Hoi C Lau
(74) *Attorney, Agent, or Firm*—Wenderoth, Lind & Ponack, L.L.P.

(57) ABSTRACT

According to an embodiment, an intrusion detection sensor includes a microwave sensor (120) that transmits microwaves toward a detection area, receives the microwaves reflected by an object present in the detection area, and outputs a reflected wave reception intensity signal according to the received intensity; a direction variable antenna device (110); a scanning measurement means (131) that provides an instruction to scan the transmission/reception direction to the direction variable antenna device (110) to determine a relationship with the output of the reflected wave reception intensity signal; a detection target object presence determination means (132) that determines whether or not a detection target object is present based on the determined relationship; and an alarm signal output control means (133) that outputs an alarm signal when it is determined that a detection target object is present.

24 Claims, 13 Drawing Sheets

U.S. PATENT DOCUMENTS

| | | | |
|---|---|---|---|
| 7,084,761 B2 * | 8/2006 | Izumi et al. | 340/541 |
| 7,084,806 B2 | 8/2006 | Toguchi et al. | |
| 7,132,975 B2 * | 11/2006 | Fullerton et al. | 342/28 |
| 7,333,047 B2 * | 2/2008 | Fullerton et al. | 342/28 |
| 2003/0112142 A1 * | 6/2003 | Izumi et al. | 340/552 |
| 2003/0164790 A1 * | 9/2003 | Kurita et al. | 342/28 |
| 2004/0090328 A1 * | 5/2004 | Tsuji | 340/552 |
| 2005/0128081 A1 * | 6/2005 | Kurita et al. | 340/552 |
| 2005/0264438 A1 * | 12/2005 | Fullerton et al. | 342/28 |
| 2008/0045832 A1 * | 2/2008 | McGrath | 600/427 |

FOREIGN PATENT DOCUMENTS

| | | |
|---|---|---|
| JP | 07-037176 | 2/1995 |
| JP | 09-026483 | 1/1997 |
| JP | 11-086153 | 3/1999 |
| JP | 2000-003478 | 1/2000 |
| JP | 2002-236171 | 8/2002 |
| JP | 2003-207462 | 7/2003 |
| JP | 2004-085363 | 3/2004 |
| JP | 2004-340729 | 12/2004 |

OTHER PUBLICATIONS

Translation of the Written Opinion of the International Searching Authority mailed Jan. 10, 2008 for International (PCT) Application PCT/JP2006/312493.

International Search Report mailed Sep. 12, 2006 for International Application No. PCT/JP2006/312493.

* cited by examiner (a)

(b)

(c)

these false alarm countermeasures are referred to as "bush/tree countermeasures" and the aforementioned threshold is referred to as "bush/tree countermeasure level".

INTRUSION DETECTION SENSOR

TECHNICAL FIELD

The present invention relates to an intrusion detection sensor having a built-in microwave sensor, and particularly to an intrusion detection sensor that improves reliability by avoiding the occurrence of false alarms to the highest degree possible.

BACKGROUND ART

A microwave sensor that detects a human body (intruder) by transmitting microwaves toward a detection area and receiving waves reflected off of the human body (microwaves modulated by the Doppler Effect) is known as an example of a conventional crime prevention device (for example, see Patent Document 1).

Furthermore, one type of microwave sensor that has been proposed involves measuring the distance to the detection target object, such as a human body, present in the detection area by using a plurality of types of microwaves of different frequencies. This type of sensor is configured such that, for example, two types of microwaves of different frequencies are transmitted toward the detection area and the phase difference between two IF signals is detected based on the respective reflected waves. This phase difference correlates to the distance to the detection target object, so that there is a tendency for greater phase differences to occur as distance to the detection target object increases. That is, it is possible to measure the distance to the detection target object by obtaining this phase difference. Furthermore, it is also possible to determine whether or not the detection target object in the detection area is moving by recognizing a change in the phase difference over time. This allows the detection of, for example, only detection target objects that are moving in the detection area.

However, problems such as the following arise when using this type of sensor as a crime prevention sensor and recognizing a change in the phase difference over time in order to recognize only the detection target object moving in the detection area. For example, when this type of sensor is installed outdoors, the sensor may generate a false alarm by erroneously detecting a tree, a bush, or the like swaying in the wind as a detection target object. Similarly, when this type of sensor is installed indoors, the sensor may generate a false alarm by erroneously detecting, as a detection target object, an object other than a human body (a non-detection target object), such as rotational movement of a ventilation fan, blinds or curtains swaying in the wind, or even vibration of the microwave sensor itself.

In view of the above, the present inventors have already proposed techniques for avoiding false alarms by accurately distinguishing between detection target objects such as human bodies and non-detection target objects such as objects other than human bodies (see Patent Document 2).

These proposals involve measuring an amount of change per unit of time in the relative distance to an object that is present in a detection area based on the respective reflected waves, and determining that the object is a detection target object only if the amount of change is not less than a predetermined threshold. More specifically, in contrast to the slight movement distance of a bush or tree swaying in the wind or a rotating fan, the movement distance is large for a detection target object such as a human body, and it is therefore possible to precisely determine whether or not the object is a detection target by recognizing this difference. It should be noted that in the following description, these false alarm countermeasures are referred to as "bush/tree countermeasures" and the aforementioned threshold is referred to as "bush/tree countermeasure level".

Patent Document 1: JP H07-37176A

Patent Document 2: JP 2003-207462A

DISCLOSURE OF INVENTION

Problem to be Solved by the Invention

However, microwave sensors as described above employ antennas having a relatively wide directivity as transmission/reception antennas by fixing the transmission/reception direction, and thus accurate detection of a proper detection target object such as an intruder may not always be possible. For example, the microwave sensors may generate a false alarm due to the influence of rain, an insect or the like coming close to the microwave sensors, the installation location, vibration of the microwave sensors themselves, or the like.

Furthermore, the microwave sensors cannot recognize the direction in which a detection target object is present, so even when a bush or tree swaying in the wind, a rotating fan, or the like is present only in a fixed direction, adopting the aforementioned "bush/tree countermeasures" results in the microwave sensors having low detection sensitivity in all directions. Furthermore, even if it is found, during installation, that a factor that can induce an erroneous detection is present in a fixed direction in the installation location, only limited remedies, such as adjusting the direction of the whole detection area, are available.

In light of the problems encountered with conventional techniques, it is an object of the present invention to provide an intrusion detection sensor that is capable of avoiding, to the highest degree possible, the occurrence of false alarms caused by effects on built-in microwave sensors due to the influence of trees and bushes or the like swaying in the wind, vibration of the microwave sensor itself, or by insects or the like coming close to the microwave sensor, and improving operational reliability by prohibiting detection in a predetermined direction or by changing the detection sensitivity depending on the direction.

Means for Solving Problem

An intrusion detection sensor according to the present invention includes a microwave sensor that transmits microwaves toward a detection area, receives the microwaves reflected by an object present in the detection area, and outputs a reflected wave reception intensity signal according to the received intensity; a direction variable antenna device that can change the direction of the microwaves transmitted/received from/by this microwave sensor within a predetermined range of angle; a scanning measurement means that provides an instruction to scan the predetermined range of angle of the transmission/reception direction to this direction variable antenna device so as to determine a relationship between the transmission/reception direction and the output of the reflected wave reception intensity signal; a detection target object presence determination means that determines whether or not a detection target object is present based on the relationship between the transmission/reception direction and the output of the reflected wave reception intensity signal determined by this scanning measurement means; and an alarm signal output control means that performs control so that an alarm signal is outputted when this detection target object presence determination means determines that a detection target object is present.

In this case, the reflected wave reception intensity signal may be a voltage signal having a positive correlation with the received intensity, and the detection target object presence determination means may be configured to determine that a detection target object is present when the ratio of a peak electrical power value of the reflected wave reception intensity signal to a value obtained by integrating the electrical power value of the reflected wave reception intensity signal over the predetermined range of angle is not less than a predetermined ratio. The direction variable antenna device may be, but is not limited to, a phased array antenna, for example.

According to the intrusion detection sensor having the above configuration, it is possible to suppress the influence of rain, insects or the like coming close to the sensor, the installation location, vibration of the intrusion detection sensor itself, or the like, and avoid false alarms and the like to the highest degree possible, and therefore the operational reliability can be improved.

The intrusion detection sensor may further include a passive type infrared sensor that receives infrared rays from the detection area, and outputs an infrared detection signal indicating the presence of a detection target object in the detection area based on a temperature difference from its surroundings. The alarm signal output control means may be configured such that it does not output the alarm signal when the infrared detection signal is not outputted from the passive type infrared sensor.

According to the intrusion detection sensor having the above configuration, by further incorporating the passive type infrared sensor, the reliability of the detection operation can be further improved.

The intrusion detection sensor may further include: a detection target object direction identification means that identifies a direction in which a detection target object is present based on the relationship between the transmission/reception direction and the output of the reflected wave reception intensity signal determined by the scanning measurement means; and a direction storage means that stores the direction identified by the detection target object direction identification means as detection restriction direction information when the detection target object presence determination means determines that a detection target object is present, and when the infrared detection signal is not outputted from the passive type infrared sensor. The alarm signal output control means may be configured such that it does not output the alarm signal even when the detection target object presence determination means determines that a detection target object is present, when a difference between the direction identified by the detection target object direction identification means and the direction corresponding to any of the detection restriction direction information stored in the direction storage means falls within a predetermined range.

In this case, when the detection target object presence determination means continues to determine that no detection target object is present for a predetermined length of time, the detection restriction direction information stored in the direction storage means may be deleted.

According to the intrusion detection sensor having the above configuration, the detection of a direction in which a factor that can induce an erroneous detection is determined to be present is automatically prohibited, and thus a further reduction of false alarms can be achieved.

Alternatively, the intrusion detection sensor according to the present invention may include: a microwave sensor that transmits a plurality of types of microwaves of different frequencies toward a detection area, receives reflected waves of the respective microwaves that have been reflected off of an object present in the detection area, and outputs distance information corresponding to a distance to the object; a direction variable antenna device that can change the direction of the plurality of types of microwaves transmitted/received from/by this microwave sensor within a predetermined range of angle; a scanning measurement means that provides an instruction to scan the predetermined range of angle of the transmission/reception direction to this direction variable antenna device and monitors the distance information during the scanning so as to determine a direction in which the object is present and detected object distance information to the object; an object movement distance recognition means that determines a movement distance per unit of time of the object based on a change in this detected object distance information over time; a detection target object presence determination means that determines that a detection target object is present in the detection area when the movement distance per unit of time determined by this object movement distance recognition means is not less than a predetermined threshold value; a passive type infrared sensor that receives infrared rays from the detection area, and outputs an infrared detection signal indicating the presence of a detection target object in the detection area based on a temperature difference from its surroundings; a direction storage means that stores the direction in which an object is identified to be present by the scanning measurement means as detection restriction direction information when the detection target object presence determination means determines that a detection target object is present, and when the infrared detection signal is not outputted from the passive type infrared sensor; and an alarm signal output control means that performs control so that an alarm signal is outputted when the detection target object presence determination means determines that a detection target object is present, and when the infrared detection signal is outputted from the passive type infrared sensor, wherein the predetermined threshold value used by the detection target object presence determination means to determine the presence or absence of a detection target object is changed to a greater value, when a difference between the direction in which an object is identified to be present by the scanning measurement means and the direction corresponding to any of the detection restriction direction information stored in the direction storage means falls within a predetermined range.

In this case, a configuration may be made such that when the detection target object presence determination means continues to determine that no detection target object is present for a predetermined length of time, the detection restriction direction information stored in the direction storage means is deleted. The direction variable antenna device may be, but is not limited to, a phased array antenna, for example.

According to the intrusion detection sensor having the above configuration, the substantial detection sensitivity is automatically reduced in the direction in which a factor that can induce an erroneous detection is determined to be present, so erroneous detection can be suppressed, and at the same time, as for the other directions, a high sensitivity equal to that normally used can be maintained, so a reduction of false alarms and an improvement in operational reliability can be achieved.

Alternatively, the intrusion detection sensor according to the present invention may include: a microwave sensor that transmits a plurality of types of microwaves of different frequencies toward a detection area, receives reflected waves of the respective microwaves that have been reflected off of an object present in the detection area, and outputs distance information corresponding to the distance to the object; a direction variable antenna device that can change the direction of the plurality of types of microwaves transmitted/received from/by this microwave sensor within a predetermined range of angle; a scanning measurement means that provides an instruction to scan the predetermined range of angle of the transmission/reception direction to this direction variable antenna device and monitors the distance information during the scanning so as to determine a direction in which the object is present and detected object distance information to the object; an object movement distance recognition means that determines a movement distance per unit of time of the object based on a change in this detected object distance information over time; a detection target object presence determination means that determines that a detection target object is present in the detection area when the movement distance per unit of time determined by this object movement distance recognition means is not less than a predetermined threshold value; a direction input means that inputs a direction that is excluded from the directions to be detected as detection exclusion direction information; and an alarm signal output control means that performs control so that an alarm signal is outputted when the detection target object presence determination means determines that a detection target object is present, and when the direction in which an object is determined to be present by the scanning measurement means does not correspond to any of the detection exclusion direction information inputted by the direction input means.

In this case, the scanning measurement means may exclude, from the scanning, a direction that corresponds to any of the detection exclusion direction information inputted by the direction input means. The direction variable antenna device may be, but is not limited to, a phased array antenna, for example. The direction input means device may be, but is not limited to, a DIP switch.

According to the intrusion detection sensor having the above configuration, the detection of the direction in which a factor that can induce an erroneous detection is determined to be present, or the detection of unwanted direction(s) can be prohibited by carrying out the presetting manually, or the like. This allows not only a further reduction of false alarms, but also allows flexible use according to the installation conditions or the intended use.

The intrusion detection sensor may further include a passive type infrared sensor that receives infrared rays from the detection area, and outputs an infrared detection signal indicating the presence of a detection target object in the detection area based on a temperature difference from its surroundings. The alarm signal output control means may be configured such that it does not output the alarm signal when the infrared detection signal is not outputted from the passive type infrared sensor.

Furthermore, in the intrusion detection sensor, the alarm signal output control means may perform control so that the alarm signal is outputted regardless of the determination result of the detection target object presence determination means when all directions are inputted as detection exclusion direction information by the direction input means.

Alternatively, the intrusion detection sensor according to the present invention may include: a microwave sensor that transmits a plurality of types of microwaves of different frequencies toward a detection area, receives reflected waves of the respective microwaves that have been reflected off of an object present in the detection area, and outputs distance information corresponding to the distance to the object; a direction variable antenna device that can change the direction of the plurality of types of microwaves transmitted/received from/by this microwave sensor within a predetermined range of angle; a scanning measurement means that provides an instruction to scan the predetermined range of angle of the transmission/reception direction to this direction variable antenna device and monitors the distance information during the scanning so as to determine a direction in which the object is present and detected object distance information to the object; an object movement distance recognition means that determines a movement distance per unit of time of the object based on a change in this detected object distance information over time; a detection target object presence determination means that determines that a detection target object is present in the detection area when the movement distance per unit of time determined by this object movement distance recognition means is not less than a predetermined threshold value; a position input means that inputs a two-dimensional position to be excluded from the detection area as detection exclusion position information; and an alarm signal output control means that performs control so that an alarm signal is outputted when the detection target object presence determination means determines that a detection target object is present, and when the direction in which an object is determined to be present and the distance to the object determined by the scanning measurement means do not correspond to any of the detection exclusion position information inputted by the position input means.

In this case, as the two-dimensional position, a polar coordinate system defined by a direction and a distance or a rectangular coordinate system may be used. The direction variable antenna device may be, but is not limited to, a phased array antenna, for example. The direction input means device may be, but is not limited to, a DIP switch.

The intrusion detection sensor may further include a passive type infrared sensor that receives infrared rays from the detection area, and outputs an infrared detection signal indicating the presence of a detection target object in the detection area based on a temperature difference from its surroundings. The alarm signal output control means may be configured such that it does not output the alarm signal when the infrared detection signal is not outputted from the passive type infrared sensor.

Alternatively, the intrusion detection sensor according to the present invention may include: a microwave sensor that transmits a plurality of types of microwaves of different frequencies toward a detection area, receives reflected waves of the respective microwaves that have been reflected off of an object present in the detection area, and outputs distance information corresponding to the distance to the object; a direction variable antenna device that can change the direction of the plurality of types of microwaves transmitted/received from/by this microwave sensor within a predetermined range of angle; a scanning measurement means that provides an instruction to scan the predetermined range of angle of the transmission/reception direction to this direction variable antenna device and monitors the distance information during the scanning so as to determine a direction in which the object is present and detected object distance information to the object; an object movement distance recognition means that determines a movement distance per unit of time of the object based on a change in this detected object distance information over time; a detection target object presence determination means that determines that a detection target object is present in the detection area when the movement distance per unit of time determined by this object movement distance recognition means is not less than a predetermined threshold value; a passive type infrared sensor that receives infrared rays from the detection area, and outputs an infrared detection signal indicating the presence of a detection target object in the detection area based on a temperature difference from its surroundings; a position storage means that stores the direction in which an object is determined to be present and the distance to the object determined by the scanning measurement means as two-dimensional detection restriction position information when the detection target object presence determination means determines that a detection target object is present, and when the infrared detection signal is not outputted from the passive type infrared sensor; and an alarm signal output control means that performs control so that an alarm signal is outputted when the detection target object presence determination means determines that a detection target object is present, and when the infrared detection signal is not outputted from the passive type infrared sensor, wherein the predetermined threshold value used by the detection target object presence determination means to determine the presence or absence of a detection target object is changed to a greater value, when the direction in which an object is determined to be present and the distance to the object determined by the scanning measurement means correspond to any of the detection restriction position information stored in the position storage means.

Alternatively, the intrusion detection sensor according to the present invention may include: a microwave sensor that transmits a plurality of types of microwaves of different frequencies toward a detection area, receives reflected waves of the respective microwaves that have been reflected off of an object present in the detection area, and outputs distance information corresponding to the distance to the object; a direction variable antenna device that can change the direction of the plurality of types of microwaves transmitted/received from/by this microwave sensor within a predetermined range of angle; a scanning measurement means that provides an instruction to scan the predetermined range of angle of the transmission/reception direction to this direction variable antenna device and monitors the distance information during the scanning so as to determine a direction in which the object is present and detected object distance information to the object; an object movement distance recognition means that determines a movement distance per unit of time of the object based on a change in this detected object distance information over time; a detection target object presence determination means that determines that a detection target object is present in the detection area when the movement distance per unit of time determined by this object movement distance recognition means is not less than a predetermined threshold value; a distance input means that inputs a distance range to be excluded from the detection area as detection exclusion distance information; and an alarm signal output control means that performs control so that an alarm signal is outputted when the detection target object presence determination means determines that a detection target object is present, and the distance to the object determined by the scanning measurement means does not correspond to any of the detection exclusion distance information inputted by the distance input means. The intrusion detection sensor may further include a passive type infrared sensor that receives infrared rays from the detection area, and outputs an infrared detection signal indicating the presence of a detection target object in the detection area based on a temperature difference from its surroundings. The alarm signal output control means may be configured such that it does not output the alarm signal when the infrared detection signal is not outputted from the passive type infrared sensor.

Alternatively, the intrusion detection sensor according to the present invention may include: a microwave sensor that transmits a plurality of types of microwaves of different frequencies toward a detection area, receives reflected waves of the respective microwaves that have been reflected off of an object present in the detection area, and outputs distance information corresponding to the distance to the object; an object movement distance recognition means that determines a movement distance per unit of time of the object based on a change in this distance information over time; a detection target object presence determination means that determines that a detection target object is present in the detection area when the movement distance per unit of time determined by this object movement distance recognition means is not less than a predetermined threshold value; a distance input means that inputs a distance range to be excluded from the detection area as detection exclusion distance information; and an alarm signal output control means that performs control so that an alarm signal is outputted when the detection target object presence determination means determines that a detection target object is present, and when the distance to the detection target object does not correspond to any of the detection exclusion distance information inputted by the distance input means. Furthermore, the intrusion detection sensor may further include a passive type infrared sensor that receives infrared rays from the detection area, and outputs an infrared detection signal indicating the presence of a detection target object in the detection area based on a temperature difference from its surroundings. The alarm signal output control means may be configured such that it does not output the alarm signal when the infrared detection signal is not outputted from the passive type infrared sensor.

EFFECTS OF THE INVENTION

According to the intrusion detection sensor of the present invention, it is possible to suppress the influence of rain, insects, or the like coming close to the sensor, the installation location, vibration of the intrusion detection sensor itself, or the like, and to avoid false alarms and the like to the highest degree possible, and therefore the operational reliability can be improved. Furthermore, by prohibiting detection in a predetermined direction or by changing the detection sensitivity according to the directions, it is possible to further improve the operational reliability.

BRIEF DESCRIPTION OF DRAWINGS

FIG. 3(a) shows a case where a human body is detected; FIG. 3(b) shows a case where the influence of rain or vibration is detected; and FIG. 3(c) shows a case where an insect coming close to the sensor is detected.

DESCRIPTION OF REFERENCE NUMERALS

100 Intrusion Detection Sensor (Embodiment 1)
100A Intrusion Detection Sensor (a variation of Embodiment 1)
110 Phased Array Antenna
111 Antenna Element
112 Phase Shift Control Circuit
120 Microwave Sensor
130 One-Chip Microcomputer
130A One-Chip Microcomputer
131 Scanning Measurement Unit
132 Detection Target Object Presence Determination Unit
133 Alarm Output Control Unit
133A Alarm Output Control Unit
140 Passive Type Infrared Sensor
200 Intrusion Detection Sensor (Embodiment 2)
230 One-Chip Microcomputer
233 Alarm Output Control Unit
234 Detection Target Object Direction Identification Unit
235 Detection Prohibition Direction Storage Unit
300 Intrusion Detection Sensor (Embodiment 3)
310 Phased Array Antenna
311 Antenna Element
312 Phase Shift Control Circuit
320 Microwave Sensor
330 One-Chip Microcomputer
331 Scanning Measurement Unit
332 Detection Target Object Presence Determination Unit
333 Alarm Output Control Unit
335 Detection Prohibition Direction Storage Unit
336 Object Movement Distance Recognition Unit
400 Intrusion Detection Sensor (Embodiment 4)
430 One-Chip Microcomputer
432 Detection Target Object Presence Determination Unit
433 Alarm Output Control Unit
450 DIP Switch
500 Intrusion Detection Sensor (Embodiment 5)
530 One-Chip Microcomputer
531 Scanning Measurement Unit
533 Alarm Output Control Unit
600 Intrusion Detection Sensor (Embodiment 6a)
630 One-Chip Microcomputer
633 Alarm Output Control Unit
650 DIP Switch

BEST MODE FOR CARRYING OUT THE INVENTION

Hereinafter, embodiments of the present invention shall be described with reference to the drawings.

Embodiment 1

Figure 1:
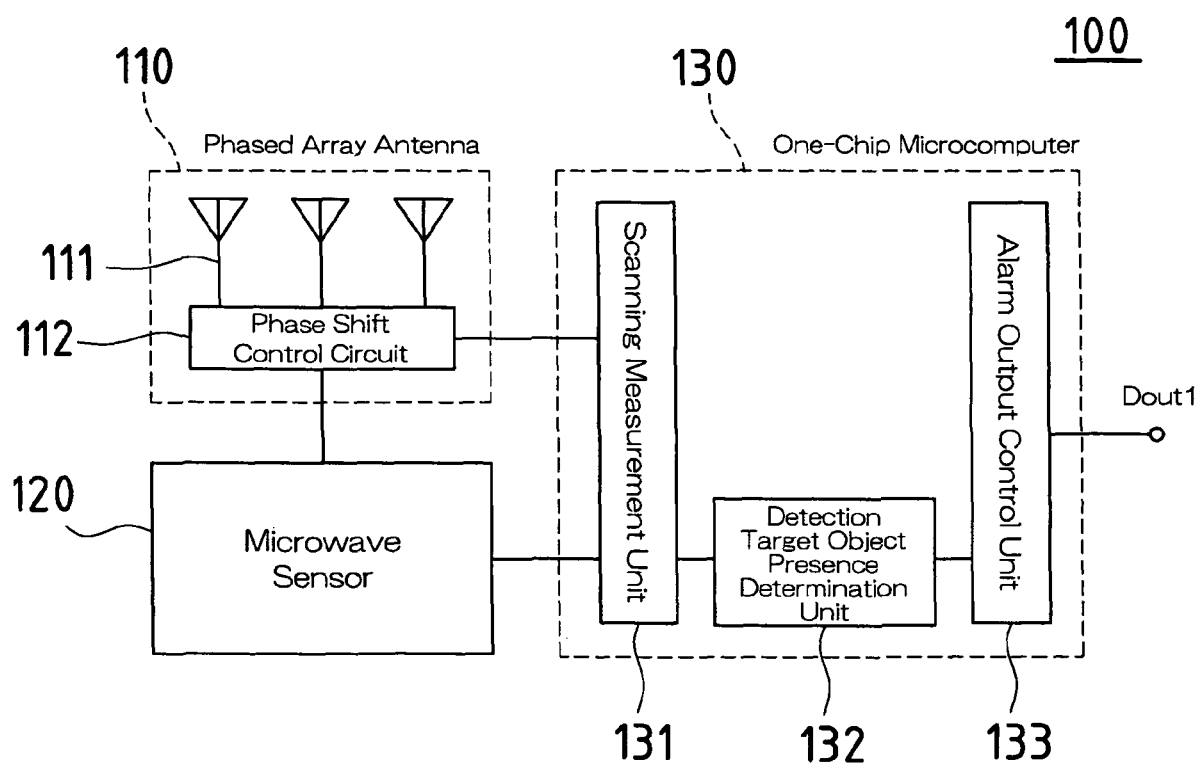
FIG. 1 is a block diagram illustrating an overall configuration of an intrusion detection sensor according to Embodiment 1 of the present invention.

FIG. 1 is a block diagram illustrating an overall configuration of an intrusion detection sensor 100 according to Embodiment 1 of the present invention. As shown in this diagram, the intrusion detection sensor 100 includes: a phased array antenna 110 that can change the transmission/reception direction of microwaves; a microwave sensor 120 that detects a detection target object such as a human body using this phased array antenna 110; and a one-chip microcomputer 130 that controls the phased array antenna 110 and the microwave sensor 120.

The phased array antenna 110 has a plurality of antenna elements 111 that are arranged at an equal spacing oriented in the same direction and a phase shift control circuit 112 that controls the amount of phase shift in the signal transmission path between these antenna elements 111 within a predetermined range. It is preferable for the phased array antenna 110 to have a narrow directivity. The phase shift control circuit 112 is a type whereby the transmission/reception direction is continuously variable by continuously changing the amount of phase shift.

The microwave sensor 120, which is of a type that transmits and receives microwaves of a single frequency, transmits the microwaves from the phased array antenna 110 into the detection area. The transmitted microwaves are reflected if an object is present in the detection area, and part of the reflected microwaves travels back in the direction of the phased array antenna 110, where the microwaves are received. The microwave sensor 120 is configured to output a reflected wave reception intensity signal having a higher voltage, the higher the reception intensity of the received microwaves is.

The one-chip microcomputer 130 includes: a scanning measurement unit 131 that provides instructions to control the amount of phase shift to the phase shift control circuit 112, and at the same time, monitors the reflected wave reception intensity signals outputted from the microwave sensor 120; a detection target object presence determination unit 132 that determines whether or not a detection target object is present based on the measurement result of this scanning measurement unit 131; and an alarm output control unit 133 that controls the output of an alarm signal Dout1 based on the determination result of this detection target object presence determination unit 132. It should be noted that the scanning measurement unit 131, the detection target object presence determination unit 132, and the alarm output control unit 133 are implemented by the software installed in the one-chip microcomputer 130, but the implementation method is not limited to software.

The output form of the alarm signal Dout1 of the alarm output control unit 133 is set as an open drain or an open collector. When the detection target object presence determination unit 132 determines that a detection target object is present, the output of the alarm signal Dout1 is set to ON. When the detection target object presence determination unit 132 determines that no detection target object is present, the output of the alarm signal Dout1 is set to open.

Figure 2:
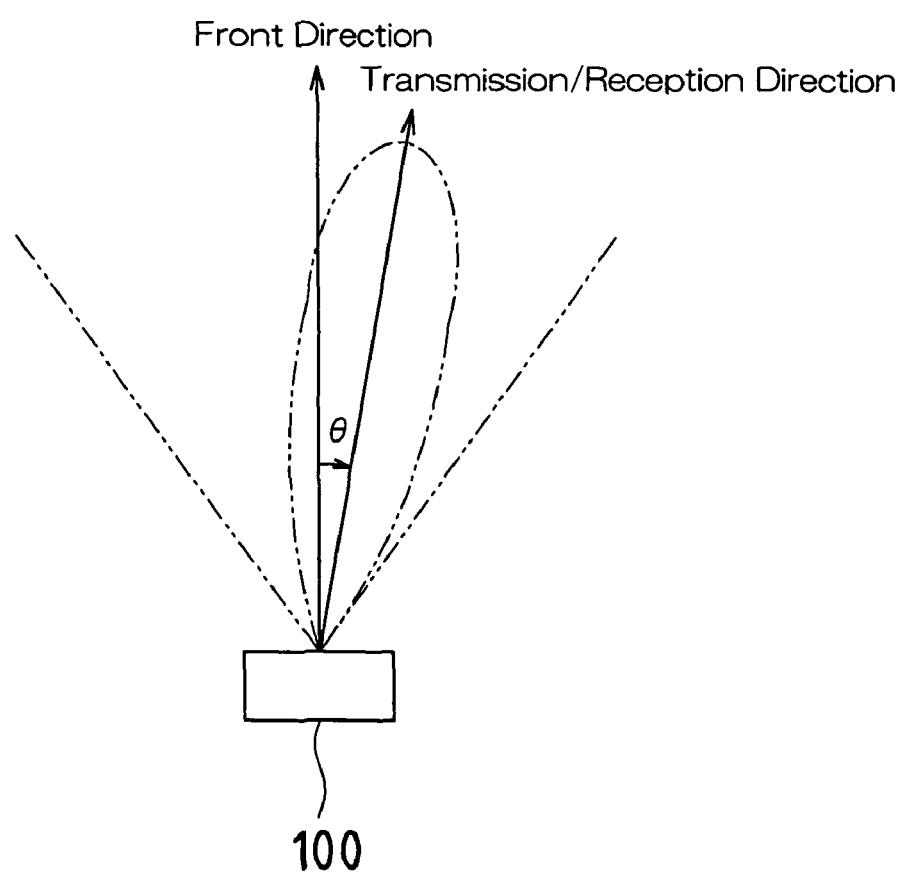
FIG. 2 is a diagram used to illustrate an antenna orientation angle θ that indicates the transmission/reception direction of a phased array antenna of the intrusion detection sensor according to Embodiment 1 of the present invention.
Figure 3:
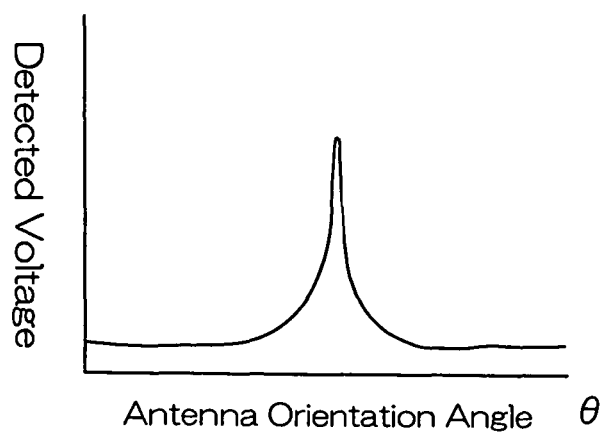
FIGS. 3(a) to 3(c) show examples of the measurement results of a scanning measurement unit of the intrusion detection sensor according to Embodiment 1 of the present invention.
Figure 3:
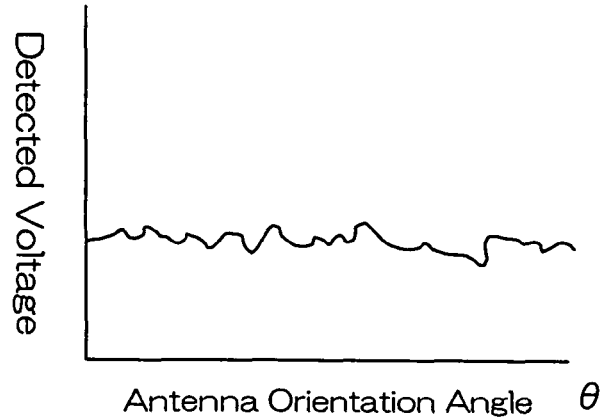
Figure 3:
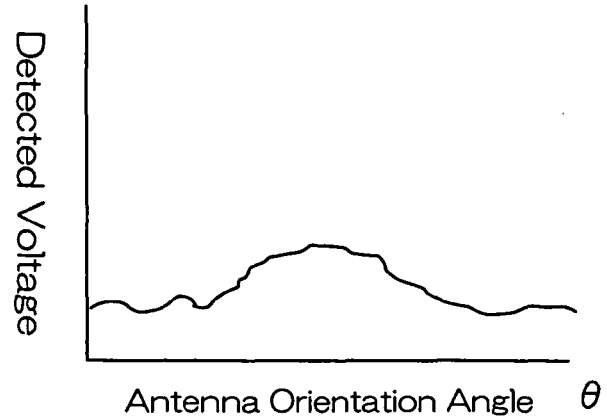

FIG. 2 is a diagram used to illustrate an antenna orientation angle θ that indicates the transmission/reception direction of the phased array antenna 110 of the intrusion detection sensor 100. FIGS. 3(a) to 3(c) show examples of the measurement results of the scanning measurement unit 131 of the intrusion detection sensor 100. FIG. 3(a) shows a case where a human body is detected. FIG. 3(b) shows a case where the influence of rain or vibration is detected. FIG. 3(c) shows a case where an insect coming close to the sensor is detected.

As used herein, the "antenna orientation angle θ" is defined as the angle of the transmission/reception direction relative to the front direction of the intrusion detection sensor 100 as shown in FIG. 2. The phased array antenna 110 can change the transmission/reception direction according to the amount of phase shift controlled by the phase shift control circuit 112. The antenna orientation angle θ has the same angle width in the plus and minus directions relative to zero degrees.

The scanning measurement unit 131 of the one-chip microcomputer 130 continuously provides instructions to change the amount of phase shift to the phase shift control circuit 112, and at the same time, monitors and stores the reflected wave reception intensity signals outputted from the microwave sensor 120 during that period. Such measurement is repeated. Through this, for example, measurement results as shown in FIGS. 3(a) to 3(c) are obtained.

FIG. 3(a) shows an example of a case where a human body present a long distance away has been detected. A sharp peak is observed around the direction in which the human body is present. The level decreases sharply on the right and left sides of the peak, and reaches a substantially constant low-level in the region sufficiently away from the peak.

In contrast, FIG. 3(b) shows an example of a case where the influence of rain or vibration is felt. In this case, an object having a certain size or the like is not present in a particular direction. The voltage varies irregularly within a certain level range, and no particular peak is observed.

FIG. 3(c) shows an example of a case where a small insect or the like that is coming close to or clings to the antenna is detected. Because the directivity of the phased array antenna 110 is not exerted sufficiently, only an extremely broad peak is observed, as compared to that of FIG. 3(a).

As described above, the measurement results differ significantly depending on the object detected, but it is necessary for the detection target object presence determination unit 132 to accurately determine whether or not a detection target object is present based on these measurement results.

For this reason, the ratio of "peak electrical power" that corresponds to the voltage at the position of a peak in the measurement result obtained from the scanning measurement unit 131 to "omnidirectional electrical power" that is obtained by integrating the voltage outputted from the microwave sensor 120 as a reflected wave reception intensity signal over the entire range of the transmission/reception direction is defined by the following equation, and is referred to as "peak quality". When this peak quality is not less than a predetermined value, it is determined that a detection target object is present.

Peak quality = [Equation 1]

$$\frac{\text{peak electrical power}}{\text{omnidirectional electrical power}} = \frac{V_0^2}{\int V(\theta)^2 d\theta}$$

$V_0$ = detected peak voltage

The phrase "the peak quality is not less than a predetermined value" can be rephrased as "the ratio of the peak electrical power to the omnidirectional electrical power is not less than a predetermined ratio".

According to the configuration of Embodiment 1 described above, it is possible to suppress the influence of rain, insects or the like coming close to the sensor, the installation location, vibration of the intrusion detection sensor itself, or the like, and to avoid false alarms and the like to the highest degree possible, and therefore the operational reliability can be improved.

Variation of Embodiment 1

Figure 4:
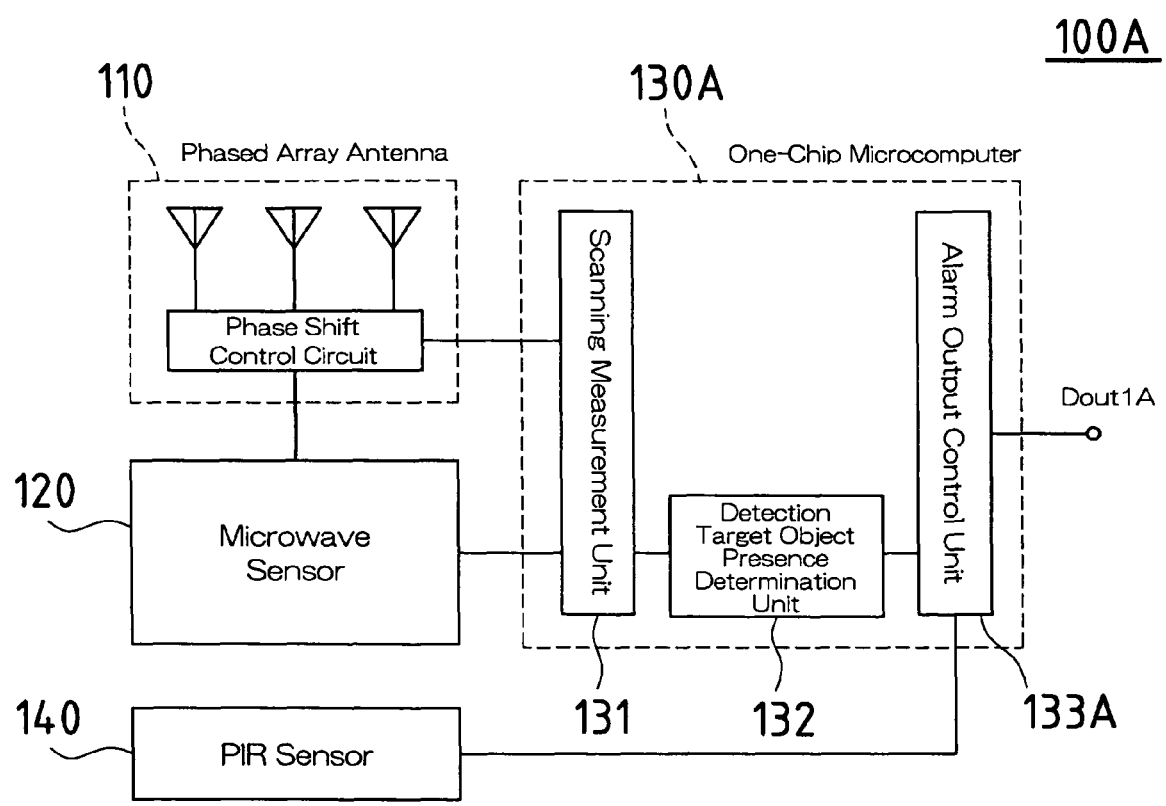
FIG. 4 is a block diagram illustrating an overall configuration of an intrusion detection sensor according to a variation on Embodiment 1 of the present invention.

FIG. 4 is a block diagram illustrating an overall configuration of an intrusion detection sensor 100A in which the operational reliability is further improved by incorporating a passive type infrared sensor (PIR sensor), as a variation of the intrusion detection sensor 100 according to Embodiment 1. Hereinafter, only differences from Embodiment 1 shall be described.

As shown in FIG. 4, this intrusion detection sensor 100A includes, in addition to the components of Embodiment 1, a passive type infrared sensor 140 that receives infrared rays from the detection area, and outputs a signal that indicates the presence or absence of a detection target object based on a temperature difference from the surroundings (a high level if a detection target object is present, and a low level if no detection target object is present).

Another difference is that in a one-chip microcomputer 130A, the output from the passive type infrared sensor 140 is connected to an alarm output control unit 133A, and the output of the passive type infrared sensor 140 is also taken into consideration for the control of the output of the alarm signal Dout1.

More specifically, even when the detection target object presence determination unit 132 determines that a detection target object is present, if the output from the passive type infrared sensor 140 is a low level indicating that no detection target object is present, it is determined that the microwave sensor 120 has made an erroneous detection for some reason, and an open state is maintained, rather than setting the output of the alarm signal Dout1 to ON.

According to the configuration as described above, it is possible to suppress the influence of rain, insects or the like coming close to the sensor, the installation location, vibration of the intrusion detection sensor itself, or the like, and to avoid false alarms and the like to the highest degree possible. Also, by further incorporating the passive type infrared sensor, the reliability of the detection operation can be further improved.

Embodiment 2

Figure 5:
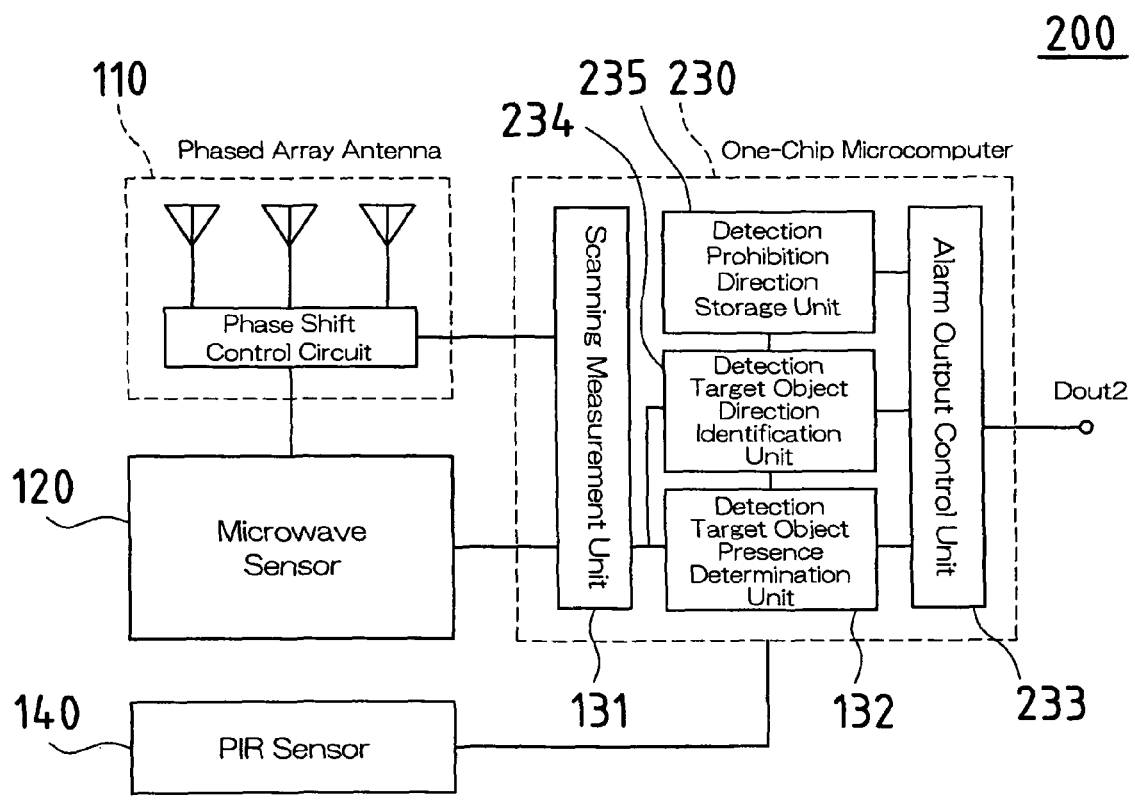
FIG. 5 is a block diagram illustrating an overall configuration of an intrusion detection sensor according to Embodiment 2 of the present invention.

FIG. 5 is a block diagram illustrating an overall configuration of an intrusion detection sensor 200 according to Embodiment 2 of the present invention. Because Embodiment 2 is identical to the variation of Embodiment 1 except for the following differences, the same reference numerals are given to the same components, and the descriptions shall focus primarily on the differences.

As shown in FIG. 5, a difference between this intrusion detection sensor 200 and the intrusion detection sensor 100A lies in the components of a one-chip microcomputer 230. More specifically, a detection target object direction identification unit 234 and a detection prohibition direction storage unit 235 are added, and the outputs of the detection target object direction identification unit 234 and the detection prohibition direction storage unit 235 are also taken into consideration for the control of the output of the alarm signal Dout2 by the alarm output control unit 233. Also, the output of the passive type infrared sensor 140 needs to be referred to by the units other than the alarm output control unit 233, and thus the output of the passive type infrared sensor 140 is connected to a one-chip microcomputer 230, rather than directly to the alarm output control unit 233.

The detection target object direction identification unit 234 finds the position of a peak in the measurement result from the scanning measurement unit 131, determines the direction that corresponds to the peak position, and transmits the determined direction to the alarm output control unit 233. Also, even when the detection target object presence determination unit 132 determines that a detection target object is present, if the output from the passive type infrared sensor 140 is a low level indicating that no detection target object is present, it is determined that a factor that causes the microwave sensor 120 to make an erroneous detection is present in that direction, and the direction is stored in the detection prohibition direction storage unit 235 as detection prohibition direction information.

The detection prohibition direction storage unit 235 transmits this detection prohibition direction information to the alarm output control unit 233. This detection prohibition direction storage unit 235 may be configured to store not only a single piece of detection prohibition direction information, but also a plurality of pieces of detection prohibition direction information. It is also possible to employ a configuration in which the detection prohibition direction information is automatically deleted if the detection target object presence determination unit 132 continues to determine that no detection target object is present for a predetermined length of time.

Even when the detection target object presence determination unit 132 determines that a detection target object is present, if any one of the following conditions applies, the alarm output control unit 233 maintains an open state rather than setting the output of the alarm signal Dout2 to ON. The first condition is when the output from the passive type infrared sensor 140 is a low level, indicating that no detection target object is present. The second condition is when the difference between the direction determined by the detection target object direction identification unit 234 and any of the detection prohibition direction information stored in the detection prohibition direction storage unit 235 is a predetermined small value.

According to the configuration of Embodiment 2 described above, it is possible to suppress the influence of rain, insects or the like coming close to the sensor, the installation location, vibration of the intrusion detection sensor itself, or the like, and to avoid false alarms and the like to the highest degree possible. Also, by further incorporating the passive type infrared sensor, the operational reliability can be further improved. Furthermore, by automatically prohibiting the detection in the direction in which a factor that can induce an erroneous detection is determined to be present, a further reduction of false alarms can be achieved.

Embodiment 3

Figure 6:
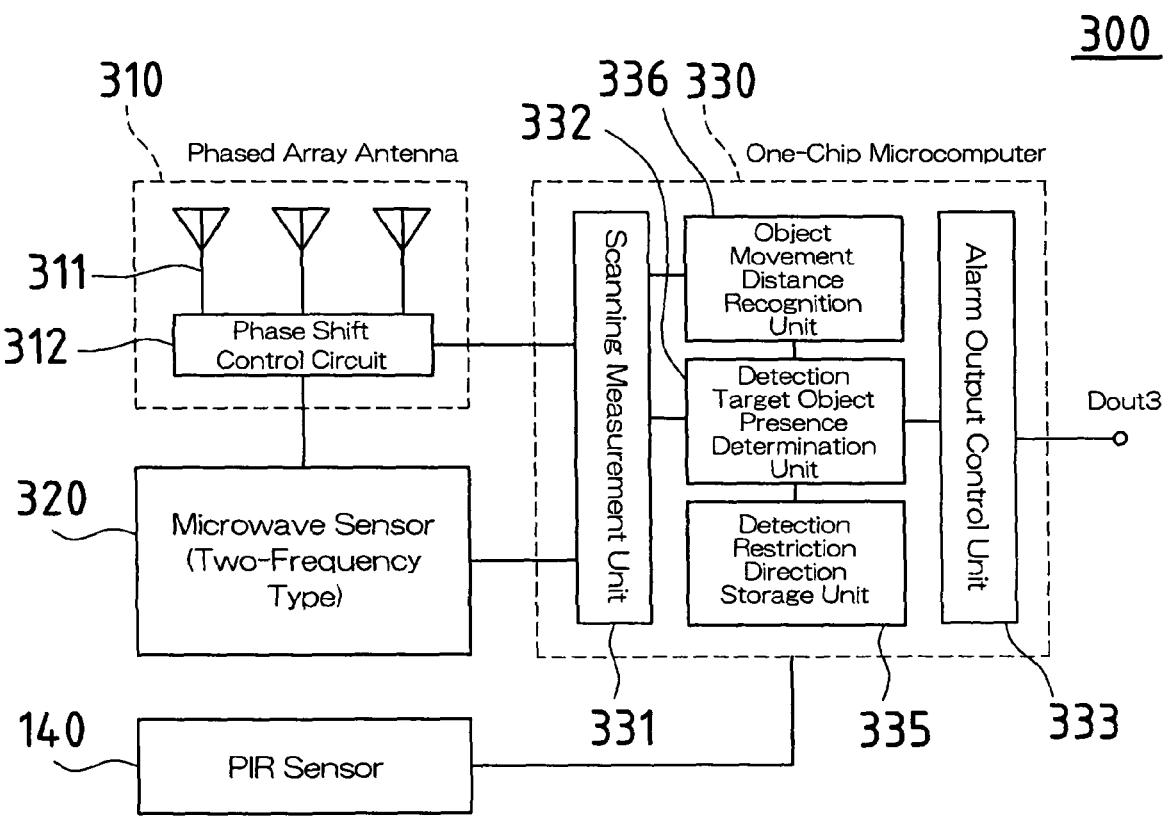
FIG. 6 is a block diagram illustrating an overall configuration of an intrusion detection sensor according to Embodiment 3 of the present invention.

FIG. 6 is a block diagram illustrating an overall configuration of an intrusion detection sensor 300 according to Embodiment 3 of the present invention. The same reference numerals are given to the same components as those of the above-described embodiments, and the descriptions shall focus primarily on the differences.

As shown in FIG. 6, this intrusion detection sensor 300 includes: a phased array antenna 310 that can change the transmission/reception direction of microwaves; a microwave sensor 320 that performs detection of a detection target object such as a human body using this phased array antenna 310; a passive type infrared sensor 140; and a one-chip microcomputer 330 that controls the phased array antenna 310, the microwave sensor 320, and the passive type infrared sensor 140.

The phased array antenna 310 has a plurality of antenna elements 311 that are arranged at an equal spacing toward the same direction, and a phase shift control circuit 312 that controls the amount of phase shift in the signal transmission path between these antenna elements 311 within a predetermined range. It is preferable for the phased array antenna 110 to have a narrow directivity. Unlike the phased array antenna 110 used in Embodiment 1 or the like, the phased array antenna 310 is a type in which the transmission/reception direction can be selected from a plurality of directions by setting the phase amount to any one of a plurality of stages.

The microwave sensor 320, which is of a type that transmits and receives two types of microwaves of different frequencies, transmits microwaves from the phased array antenna 310 to the detection area. The transmitted microwaves are reflected if an object is present in the detection area, and part of the reflected microwaves travels back in the direction of the phased array antenna 310, where the microwaves are received. The microwave sensor 320 is configured to detect a phase difference between two IF signals based on the received reflected waves and output detected object distance signals based on this phase difference.

The one-chip microcomputer 330 has a scanning measurement unit 331, an object movement distance recognition unit 336, a detection target object presence determination unit 332, a detection restriction direction storage unit 335, and an alarm output control unit 333. It should be noted that these units are implemented by the software installed in the one-chip microcomputer 330, but the implementation method is not limited to software.

The scanning measurement unit 331 provides instructions to control the amount of phase shift to the phase shift control circuit 312, and at the same time, monitors detected object distance signals outputted from the microwave sensor 320 so as to determine the direction in which the detected object is present and the distance information to the detected object.

The object movement distance recognition unit 336 determines the movement distance of the detected object per unit of time based on the change over time in the distance information to the detected object determined by this scanning measurement unit 331.

The detection target object presence determination unit 332 compares the movement distance of the detected object determined by this object movement distance recognition unit 336 with a predetermined threshold value (bush/tree countermeasure level), and determines that the object is a bush or tree swaying in the wind if the movement distance is less than the bush/tree countermeasure level. Even if the movement distance of the detected object is not less than the bush/tree countermeasure level, if the output from the passive type infrared sensor 140 is a low level indicating that no detection target object is present, the detection target object presence determination unit 332 determines that the microwave sensor 320 has made an erroneous detection for some reason. Then, the direction in which the detected object is present, outputted from the scanning measurement unit 331, is stored in the detection restriction direction storage unit 335 as detection restriction direction information, so that similar erroneous detections can be suppressed in the subsequent detection operations. If the movement distance of the detected object is not less than the bush/tree countermeasure level, and the output from the passive type infrared sensor 140 is a high level, it is determined that a detection target object such as an intruder is indeed present.

If the direction in which the detected object is present that is outputted from the scanning measurement unit 331 matches with any of the detection restriction direction information that is already stored in the detection restriction direction storage unit 335, a value higher than that normally used is employed as the bush/tree countermeasure level to perform the determination. Thereby, the detection sensitivity is substantially lowered in the direction in which a factor that can induce an erroneous detection is determined to be present, so erroneous detection can be suppressed without having to reduce the detection sensitivity in the other directions.

Furthermore, it is also possible to employ a configuration in which the detection restriction direction information stored in the detection restriction direction storage unit 335 is automatically deleted if the detection target object presence determination unit 332 continues to determine that no detection target object is present for a predetermined length of time.

The output form of the alarm signal Dout3 of the alarm output control unit 333 is set as an open drain or an open collector. When the detection target object presence determination unit 332 determines that a detection target object is present, the output of the alarm signal Dout3 is set to ON. When the detection target object determines that no detection target object is present, the output of the alarm signal Dout3 is set to open.

According to the configuration of Embodiment 3 as described above, the substantial detection sensitivity is automatically reduced in the direction in which a factor that can induce an erroneous detection is determined to be present, so erroneous detection can be suppressed, and at the same time, as for the other directions, a high sensitivity equal to that normally used can be maintained, so a reduction of false alarms and an improvement in operational reliability can be achieved.

Embodiment 4

Figure 7:
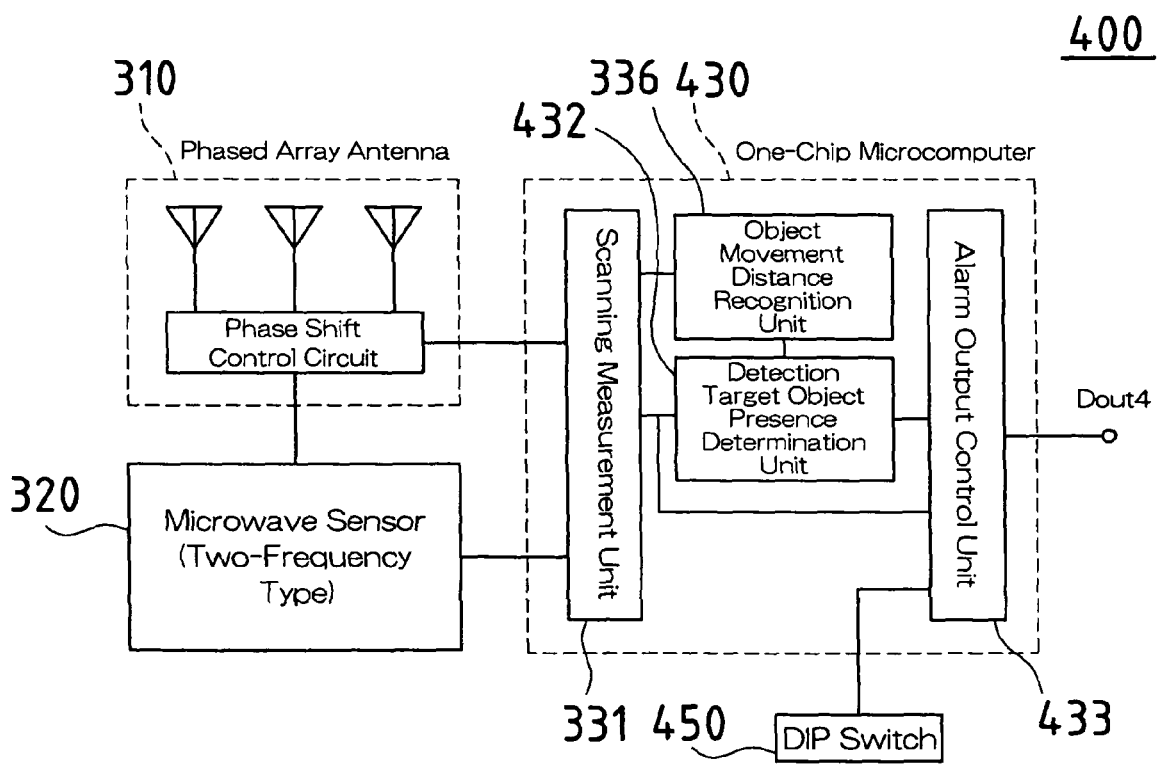
FIG. 7 is a block diagram illustrating an overall configuration of an intrusion detection sensor according to Embodiment 4 of the present invention.

FIG. 7 is a block diagram illustrating an overall configuration of an intrusion detection sensor 400 according to Embodiment 4 of the present invention. Embodiment 4 is identical to Embodiment 3 except for the following differences, and some of these differences also have commonality with those of the above embodiments; accordingly, the same reference numerals are given to the same components, and only the main differences shall be described.

As shown in FIG. 7, this intrusion detection sensor 400 includes: a phased array antenna 310 that can change the transmission/reception direction of microwaves; a microwave sensor 320 that performs detection of a detection target object such as a human body using this phased array antenna 310; a one-chip microcomputer 430 that controls the phased array antenna 310 and the microwave sensor 320; and a DIP switch 450 that serves as a means for inputting information to this one-chip microcomputer 430.

Figure 8:
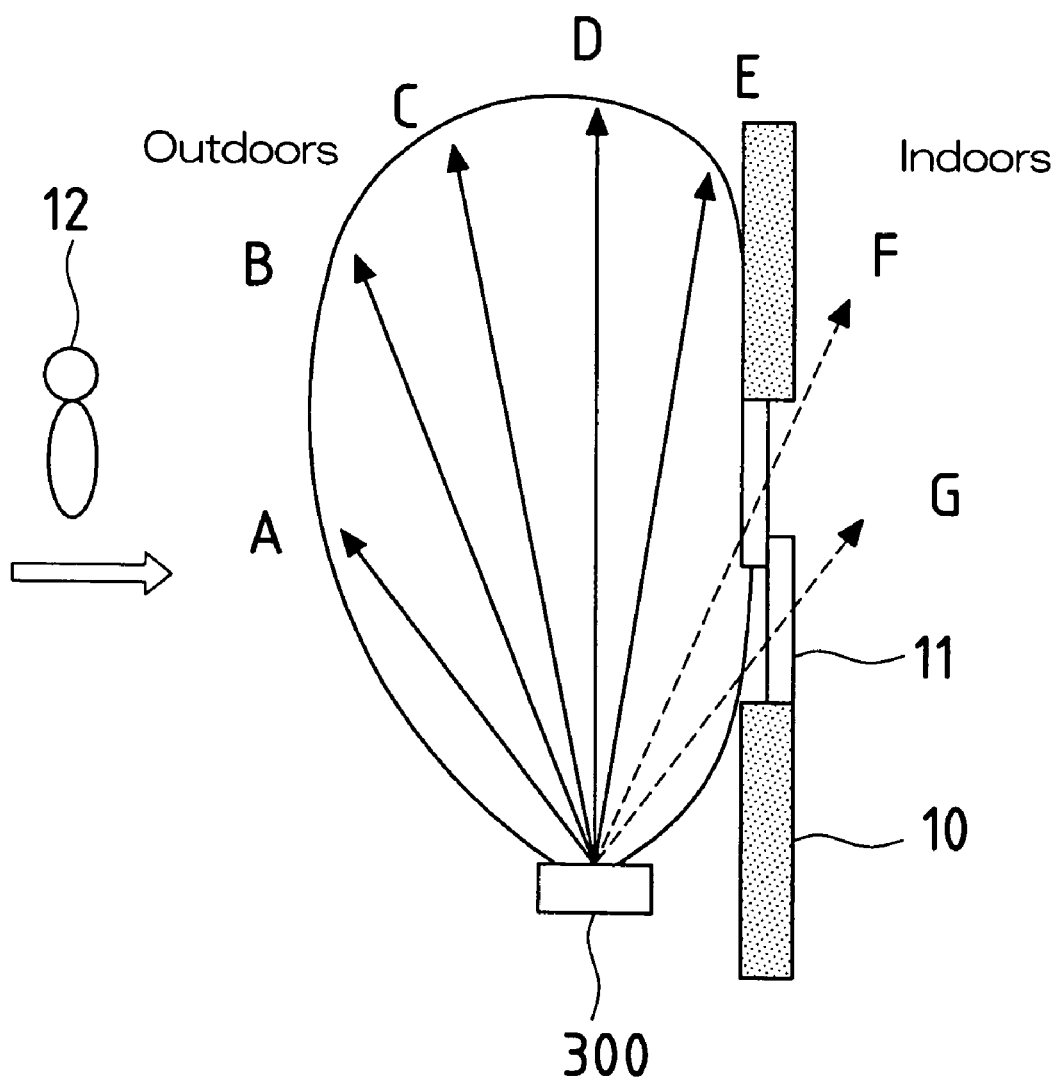
FIG. 8 is a diagram used to illustrate the division of the detection area of the intrusion detection sensor according to Embodiment 4 of the present invention.

This intrusion detection sensor 400 is installed as shown in FIG. 8 such that the detection area is formed along a wall 10 in the lateral direction of a window 11 of a building, so that an intruder 12 entering from the window 11 can be detected. The detection area is divided into seven directions (A to G).

The DIP switch 450 has seven switch elements, the same number as the directions into which the detection area has been divided. By turning each switch element ON, the detection result of the corresponding direction of the detection area is invalidated. In order to clarify the correspondence relation between each direction of the detection area and each switch element of the DIP switch 450, the DIP switch 450 is disposed in the intrusion detection sensor 400 such that the directions correspond to the seven directions of the detection area. For example, the DIP switch 450 is disposed such that the rightmost switch element of the DIP switch 450 corresponds to the rightmost direction G of the detection area. This facilitates operations such as installation and adjustment.

The one-chip microcomputer 430 includes a scanning measurement unit 331, an object movement distance recognition unit 336, a detection target object presence determination unit 432, and an alarm output control unit 433. The difference between the detection target object presence determination unit 432 and the detection target object presence determination unit 332 is that the detection target object presence determination unit 432 does not have a function for accessing the detection restriction direction storage unit 335.

Even if the detection target object presence determination unit 432 determines that a detection target object is present, if the direction in which the detected object is present that is outputted from the scanning measurement unit 331 matches with the direction in which detection is prohibited by the DIP switch 450, the alarm output control unit 433 holds the output of an alarm signal Dout4 in an open state rather than setting the output of the alarm signal Dout4 to ON.

When the sensor is installed as shown in FIG. 8, for example, the sensor may detect a human figure or the like inside the building through the window 11 or the wall 10, resulting in an erroneous detection. However, such an erroneous detection can be prevented by setting, in advance, the DIP switch 450 to not point detection in the directions of F and G, which correspond to the directions in which the window 11 is located. Besides this, the detection direction can be restricted freely according to the installation conditions or the intended use.

According to the configuration of Embodiment 4 described above, the detection of the direction in which a factor that can induce an erroneous detection is determined to be present, or the detection of unwanted direction(s) can be prohibited by carrying out the presetting manually, or the like. This allows not only a further reduction of false alarms, but also allows flexible use according to the installation conditions or the intended use.

Embodiment 5

Figure 9:
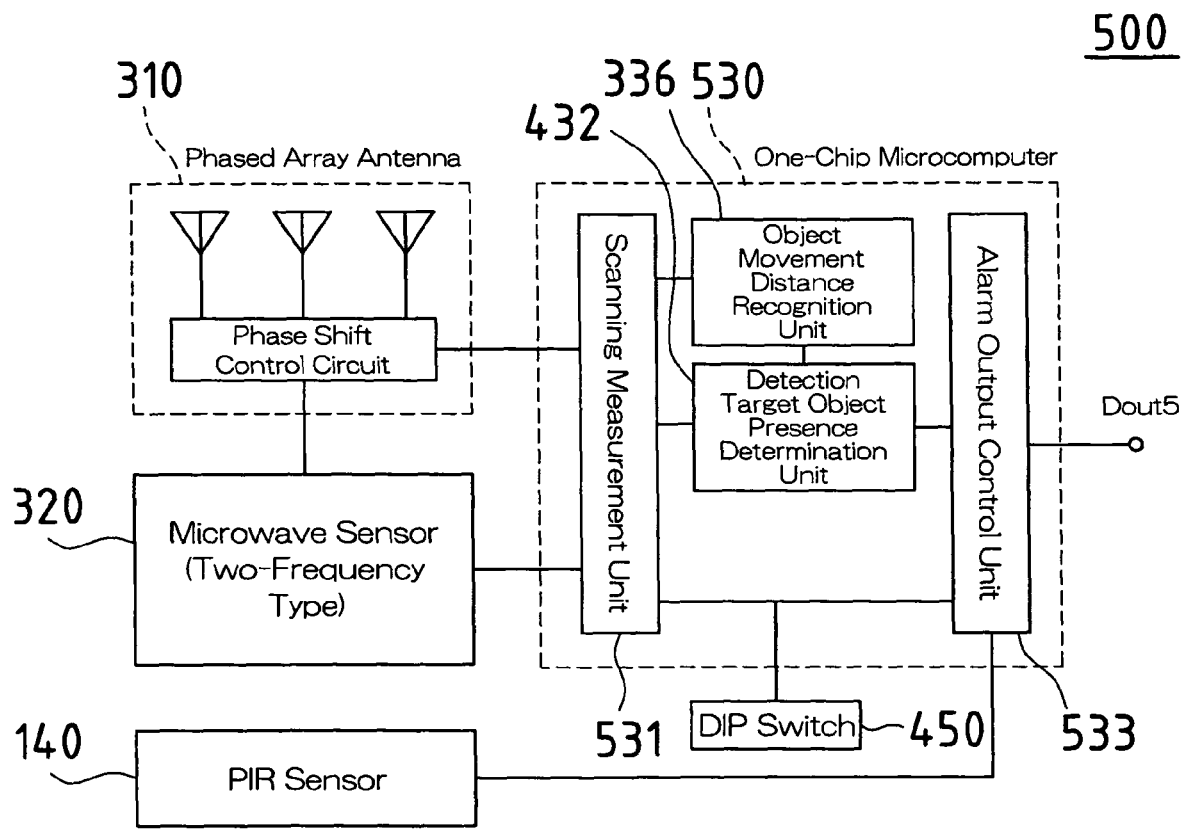
FIG. 9 is a block diagram illustrating an overall configuration of an intrusion detection sensor according to Embodiment 5 of the present invention.

FIG. 9 is a block diagram illustrating an overall configuration of an intrusion detection sensor 500 according to Embodiment 5 of the present invention. Embodiment 5 is identical to Embodiment 4 except for the following differences, and some of these differences also have some commonality with those of the above embodiments; accordingly, the same reference numerals are given to the same components, and only the main differences shall be described.

As shown in FIG. 9, this intrusion detection sensor 500 includes: a phased array antenna 310 that can change the transmission/reception direction of microwaves; a microwave sensor 320 that performs detection of a detection target object such as a human body using this phased array antenna 310; a passive type infrared sensor 140; a one-chip microcomputer 530 that controls the phased array antenna 310, the microwave sensor 320 and the passive type infrared sensor 140; and a DIP switch 450 that serves as a means for inputting information to this one-chip microcomputer 530.

The one-chip microcomputer 530 includes a scanning measurement unit 531, an object movement distance recognition unit 336, a detection target object presence determination unit 432, and an alarm output control unit 533.

The scanning measurement unit 531 provides instructions to control the amount of phase shift to the phase shift control circuit 312, and at the same time, monitors detected object distance signals outputted from the microwave sensor 320 to determine the direction in which the detected object is present and the distance information to the detected object. In this case, the direction(s) in which detection is prohibited by the DIP switch 450 is excluded. This eliminates the detection operation of unwanted direction(s), and allows the detection operation of only necessary directions.

Even if the detection target object presence determination unit 432 determines that a detection target object is present, if the output from the passive type infrared sensor 140 is a low level indicating that no detection target object is present, the alarm output control unit 533 holds the output of an alarm signal Dout5 in an open state rather than setting the output of the alarm signal Dout5 to ON.

Incidentally, if all the switch elements of the DIP switch 450 are mistakenly set to ON, the microwave sensor 320 does not perform detection in any of the directions of the detection area, losing the function as the intrusion detection sensor 500. In order to address this, a configuration is employed in which, if the alarm output control unit 533 finds that all switch elements of the DIP switch 450 are turned ON, the alarm signal Dout5 is controlled according to only the output from the passive type infrared sensor 140. More specifically, if the output from the passive type infrared sensor 140 is a high level, the output of the alarm signal Dout5 is set to ON. If the output from the passive type infrared sensor 140 is a low level, the output of the alarm signal Dout5 is maintained in an open state.

Embodiment 6

Figure 10:
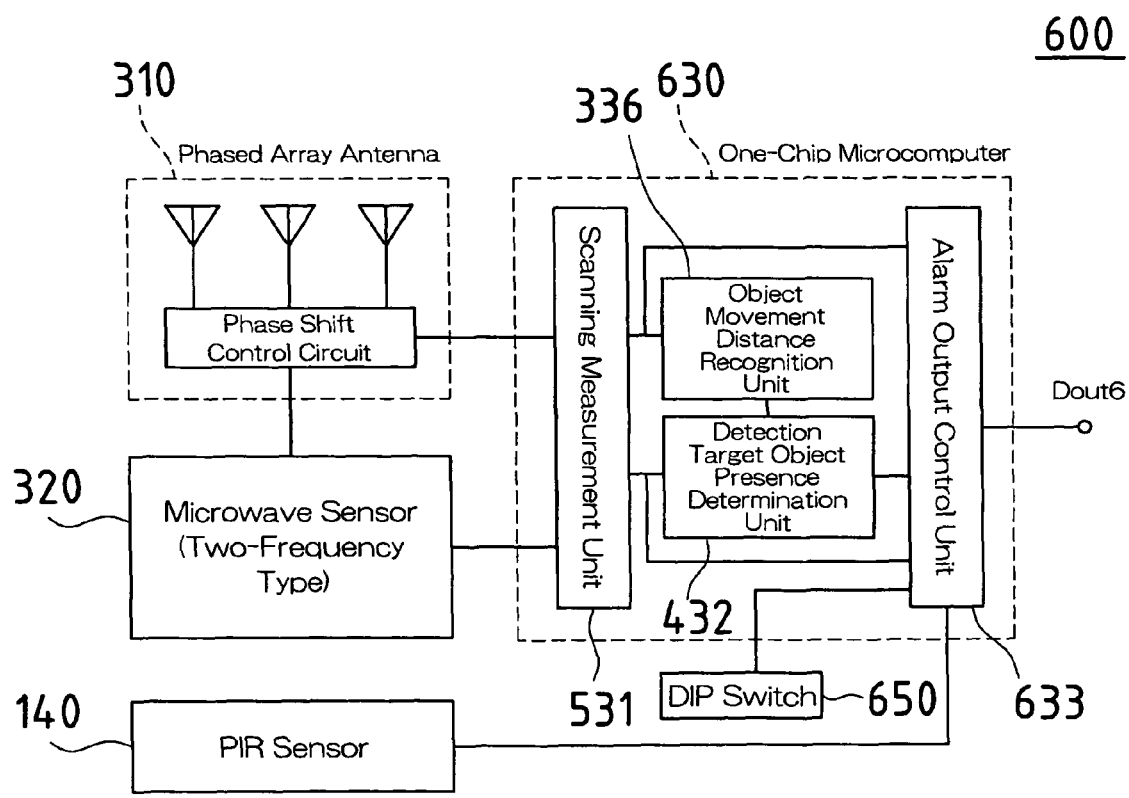
FIG. 10 is a block diagram illustrating an overall configuration of an intrusion detection sensor according to Embodiment 6 of the present invention.

FIG. 10 is a block diagram illustrating an overall configuration of an intrusion detection sensor 600 according to Embodiment 6 of the present invention. Embodiment 6 is identical to Embodiments 4 and 5 except for the following differences, and some of the differences also have some commonality with those of the above embodiments; accordingly, the same reference numerals are given to the same components, and only the main differences shall be described.

As shown in FIG. 10, this intrusion detection sensor 600 includes: a phased array antenna 310 that can change the transmission/reception direction of microwaves; a microwave sensor 320 that performs detection of a detection target object such as a human body using this phased array antenna 310; a passive type infrared sensor 140; a one-chip microcomputer 630 that controls the phased array antenna 310, the microwave sensor 320 and the passive type infrared sensor 140; and a DIP switch 650 that serves as a means for inputting information to this one-chip microcomputer 630.

The one-chip microcomputer 630 includes a scanning measurement unit 531, an object movement distance recognition unit 336, a detection target object presence determination unit 432, and an alarm output control unit 633. The direction in which the detected object is present and the distance information to the detected object, which are determined by the scanning measurement unit 531, are transmitted to the alarm output control unit 633 as well.

Figure 11:
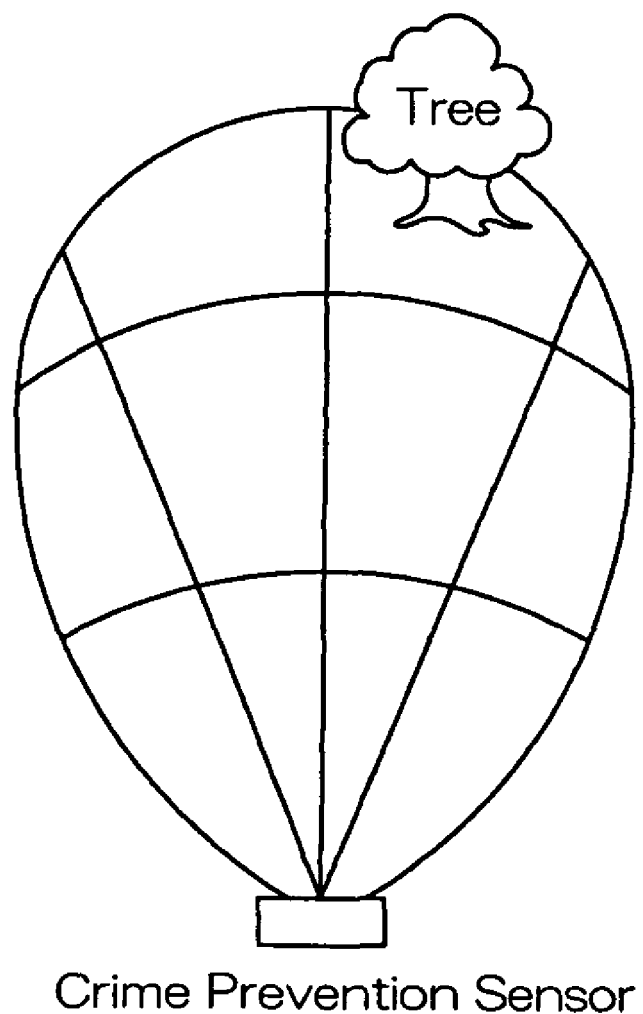
FIG. 11 is a diagram used to illustrate the division of the detection area of the intrusion detection sensor according to Embodiment 6 of the present invention.

This allows the alarm output control unit 633 to recognize the two-dimensional position of the detected object with directions and distances, and thus a function similar to that of Embodiment 4 or 5 can be two-dimensionally expanded. For example, as shown in FIG. 11, the detection area is divided into a plurality of sub-detection areas by combinations of directions and distances, and as the DIP switch 650, one having the same number of switch elements as the number of sub-detection areas may be used.

<Other Variations>

Figure 12:
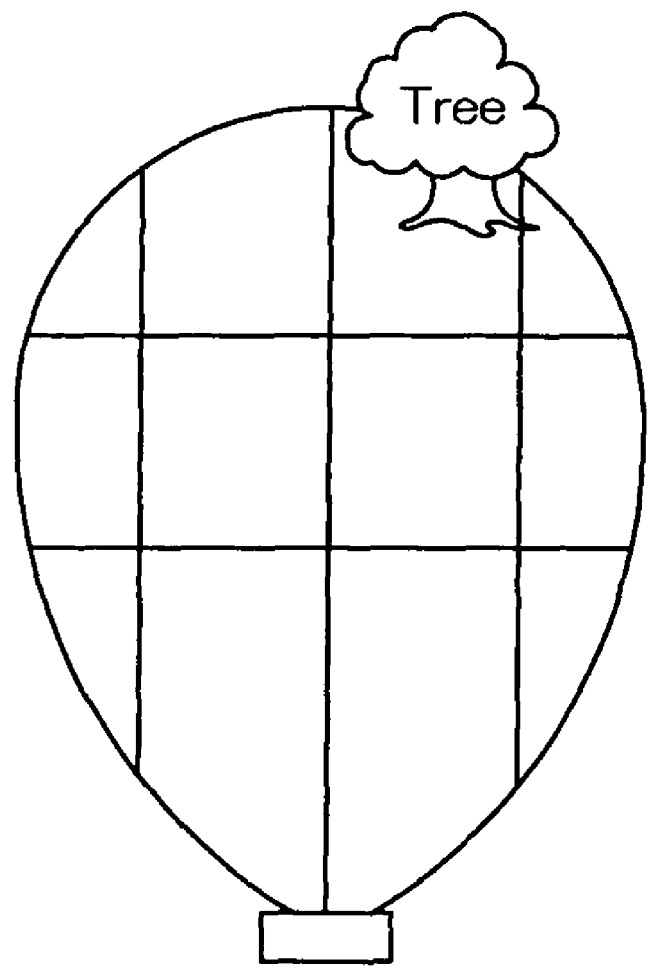
FIG. 12 is a diagram used to illustrate the division of the detection area of an intrusion detection sensor according to a variation on Embodiment 6 of the present invention.

The directions and distances that represent the two-dimensional position of the detected object in Embodiment 6 can be easily converted to a rectangular coordinate system. Accordingly, by adding this coordinate conversion function to Embodiment 6, the detection area can be divided as shown in FIG. 12.

In this case, the correspondence relation between each switch element of the DIP switch and the position of each sub-detection area is clear, and thus an operation such as installation or adjustment can be carried out with ease.

Figure 13:
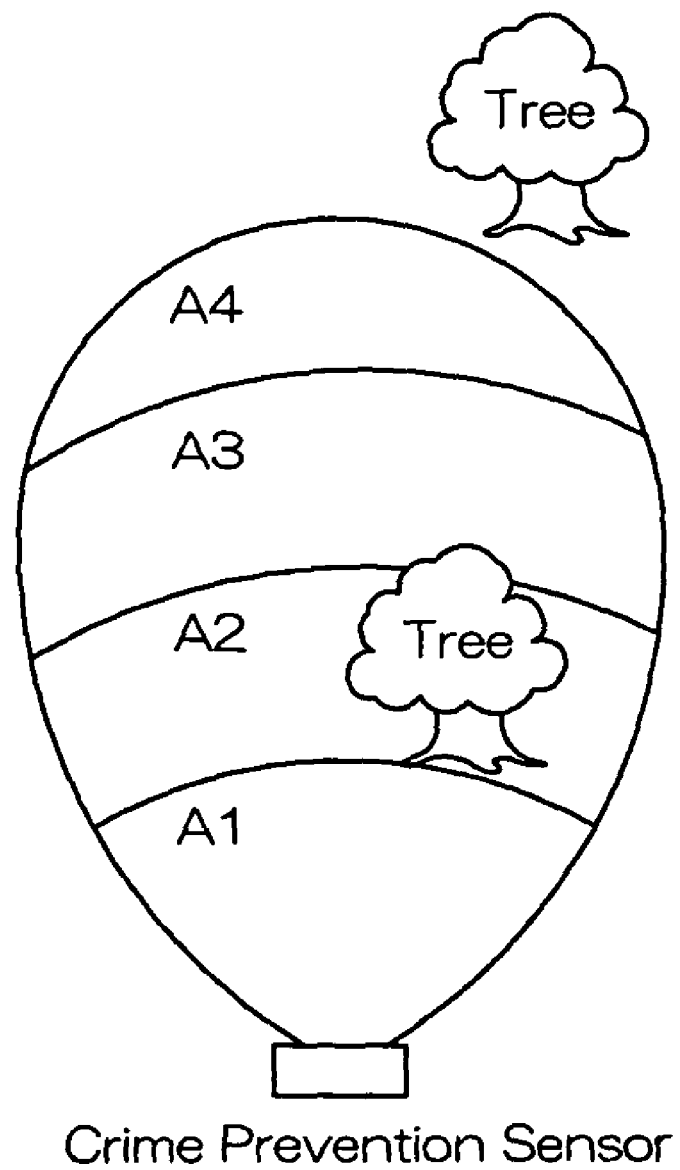
FIG. 13 is a diagram used to illustrate the division of the detection area of an intrusion detection sensor according to another variation on Embodiment 6 of the present invention.

Depending on the installation location or intended use, it is also possible to divide the detection area, for example, into a plurality of sub-detection areas (A1 to A4) as shown in FIG. 13 using only distances without performing the division using directions. In this case, a configuration is made such that the detection area (A2, A4) located at the distance in which a factor that can induce an erroneous detection such as a bush or tree is present can be invalidated by the settings of the DIP switch or the like. Alternatively, instead of invalidating the relevant sub-detection areas, a configuration may be made such that the bush/tree countermeasures are reinforced (the substantial sensitivity is decreased) as in Embodiment 3.

In addition, in the case of dividing the detection area into a plurality of sub-detection area using only distances, the configuration can be made simpler than that of Embodiment 6. Specifically, a configuration can be employed in which the phased array antenna 310 is replaced with a conventional antenna, the scanning measurement unit 531 is omitted, and the object movement distance recognition unit 336 directly monitors the distance information outputted from the microwave sensor 320. Furthermore, it is also possible to omit the passive type infrared sensor 140 where appropriate.

Even with such a simple configuration, it is possible to implement the division of the detection area as shown in FIG. 13 using only distances.

It should be appreciated that it is possible to combine the configuration in which the two-dimensional position of the detected object is recognized with the bush/tree countermeasures as described in Embodiment 3.

The present invention can be embodied and practiced in other different forms without departing from the spirit and essential characteristics thereof. Therefore, the above-described embodiments are considered in all respects as illustrative and not restrictive. The scope of the invention is indicated by the appended claims rather than by the foregoing description. All variations and modifications falling within the scope of the appended claims are intended to be embraced therein.

This application claims priority on Patent Application No. 2005-184661 filed in Japan on Jun. 24, 2005, the contents of which are hereby incorporated by reference. All references cited herein are also hereby specifically incorporated by reference.

INDUSTRIAL APPLICABILITY

The present invention is suitable for a crime prevention sensor or the like, which generates an alarm upon detection of an intruder or the like in the detection area.

The invention claimed is:

1. An intrusion detection sensor comprising:
a microwave sensor that transmits microwaves toward a detection area, receives the microwaves reflected by an object present in the detection area, and outputs a reflected wave reception intensity signal according to the received intensity;
a direction variable antenna device that can change the direction of the microwaves transmitted/received from/by the microwave sensor within a predetermined range of angle;
a scanning measurement means that provides, to the direction variable antenna device, an instruction to scan the predetermined range of angle of the transmission/reception direction so as to determine a relationship between the transmission/reception direction and the output of the reflected wave reception intensity signal;
a detection target object presence determination means that determines whether or not a detection target object is present based on the relationship between the transmission/reception direction and the output of the reflected wave reception intensity signal determined by the scanning measurement means; and
an alarm signal output control means that performs control so that an alarm signal is outputted when the detection target object presence determination means determines that a detection target object is present wherein the reflected wave reception intensity signal is a voltage signal having a positive correlation with the received intensity, and the detection target object presence determination means determines obtained by integrating the electrical power value of the reflected wave reception intensity signal over the predetermined range of angle is not less than a predetermined ratio.

2. The intrusion detection sensor according to claim 1, further comprising:
a passive type infrared sensor that receives infrared rays from the detection area, and outputs an infrared detection signal indicating the presence of a detection target object in the detection area based on a temperature difference from its surroundings,
wherein the alarm signal output control means does not output the alarm signal when the infrared detection signal is not outputted from the passive type infrared sensor.

3. The intrusion detection sensor according to claim 2, further comprising:
a detection target object direction identification means that identifies a direction in which a detection target object is present based on the relationship between the transmission/reception direction and the output of the reflected wave reception intensity signal determined by the scanning measurement means; and
a direction storage means that stores the direction identified by the detection target object direction identification means as detection restriction direction information when the detection target object presence determination means determines that a detection target object is present, and when the infrared detection signal is not outputted from the passive type infrared sensor,
wherein the alarm signal output control means does not output the alarm signal even when the detection target object presence determination means determines that a detection target object is present, when a difference between the direction identified by the detection target object direction identification means and the direction corresponding to any of the detection restriction direction information stored in tie direction storage means falls within a predetermined range.

4. The intrusion detection sensor according to claim 3, wherein the detection restriction direction information stored in the direction storage means is deleted when the detection target object presence determination means continues to determine that no detection target object is present for a predetermined length of time.

5. The intrusion detection sensor according to claim 1, wherein the direction variable antenna device is a phased array antenna.

6. An intrusion detection sensor comprising:
a microwave sensor that transmits a plurality of types of microwaves of different frequencies toward a detection area, receives reflected waves of the respective microwaves that have been reflected off of an object present in the detection area, and outputs distance information corresponding to a distance to the object;
a direction variable antenna device that can change the direction of 20 the plurality of types of microwaves transmitted/received from/by the microwave sensor within a predetermined range of angle;
a scanning measurement means that provides, to the direction variable antenna device, an instruction to scan the predetermined range of angle of the transmission/reception direction and monitors the distance information during the scanning so as to determine a direction in which the object is present and detected object distance information to the object;
an object movement distance recognition means that determines a movement distance per unit of time of the object based on a change in the detected object distance information over time;
a detection target object presence determination means that determines that a detection target object is present in the detection area when the movement distance per unit of time determined by the object movement distance recognition means is not less than a predetermined threshold value;
a passive type infrared sensor that receives infrared rays from the detection area, and outputs an infrared detection signal indicating the presence of a detection target object in the detection area based on a temperature difference from its surroundings;
a direction storage means that stores the direction in which an object is identified to be present by the scanning measurement means as detection restriction direction information when the detection target object presence determination means determines that a detection target object is present, and when the infrared detection signal is not outputted from the passive type infrared sensor; and
an alarm signal output control means that performs control so that an alarm signal is outputted when the detection target object presence determination means determines that a detection target object is present, and when the infrared detection signal is outputted from the passive type infrared sensor,
wherein the predetermined threshold value used by the detection target object presence determination means to determine the presence or absence of a detection target object is changed to a greater value, when a difference between the direction in which an object is identified to be present by the scanning measurement means and the direction corresponding to any of the detection restriction direction information stored in the direction storage means falls within a predetermined range.

7. The intrusion detection sensor according to claim 6, wherein the detection restriction direction information stored in the direction storage means is deleted when the detection target object presence determination means continues to determine that no detection target object is present for a predetermined length of time.

8. The intrusion detection sensor according to claim 6, wherein the direction variable antenna device is a phased array antenna.

9. An intrusion detection sensor comprising:
a microwave sensor that transmits a plurality of types of microwaves of different frequencies toward a detection area, receives reflected waves of the respective microwaves that have been reflected off of an object present in the detection area, and outputs distance information corresponding to the distance to the object;
a direction variable antenna device that can change the direction of the plurality of types of microwaves transmitted/received from/by the microwave sensor within a predetermined range of angle;
a scanning measurement means that provides, to the direction variable antenna device, an instruction to scan the predetermined range of angle of the transmission/reception direction and monitors the distance information during the scanning so as to determine a direction in which the object is present and detected object distance information to the object;
an object movement distance recognition means that determines a movement distance per unit of time of the object based on a change in the detected object distance information over time;
a detection target object presence determination means that determines that a detection target object is present in the detection area when the movement distance per unit of time determined by the object movement distance recognition means is not less than a predetermined threshold value;
a direction input means that inputs a direction that is excluded from the directions to be detected as detection exclusion direction information; and
an alarm signal output control means that performs control so that an alarm signal is outputted when the detection target object presence determination means determines that a detection target object is present, and when the direction in which an object is determined to be present by the scanning measurement means does not correspond to any of the detection exclusion direction information inputted by the direction input means.

10. The intrusion detection sensor according to claim 9, wherein the scanning measurement means excludes, from the scanning, a direction that corresponds to any of the detection exclusion direction information inputted by the direction input means.

11. The intrusion detection sensor according to claim 10, further comprising:
a passive type infrared sensor that receives infrared rays from the detection area, and outputs an infrared detection signal indicating the presence of a detection target object in the detection area based on a temperature difference from its surroundings,
wherein the alarm signal output control means does not output the alarm signal when the infrared detection signal is not outputted from the passive type infrared sensor.

12. The intrusion detection sensor according to claim 11, wherein the alarm signal output control means performs control so that the alarm signal is outputted regardless of the determination result of the detection target object presence determination means when all directions are inputted as detection exclusion direction information by the direction input means.

13. The intrusion detection sensor according to claim 9, wherein the direction input means is a DIP switch.

14. The intrusion detection sensor according to claim 13, wherein the DIP switch is disposed such that each switch element of the DIP switch corresponds to the position of the corresponding direction in the detection area during installation.

15. The intrusion detection sensor according to claim 9, wherein the direction variable antenna device is a phased array antenna.

16. An intrusion detection sensor comprising:
a microwave sensor that transmits a plurality of types of microwaves of different frequencies toward a detection area, receives reflected waves of the respective microwaves that have been reflected off of an object present in the detection area, and outputs distance information corresponding to the distance to the object;
a direction variable antenna device that can change the direction of the plurality of types of microwaves transmitted/received from/by the microwave sensor within a predetermined range of angle;
a scanning measurement means that provides, to the direction variable antenna device, an instruction to scan the predetermined range of angle of the transmission/reception direction and monitors the distance information during the scanning so as to determine a direction in which the object is present and detected object distance information to the object;
an object movement distance recognition means that determines a movement distance per unit of time of the object based on a change in the detected object distance information over time;
a detection target object presence determination means that determines that a detection target object is present in the detection area when the movement distance per unit of time determined by the object movement distance recognition means is not less than a predetermined threshold value;
a position input means that inputs a two-dimensional position to be excluded from the detection area as detection exclusion position information; and
an alarm signal output control means that performs control so that an alarm signal is outputted when the detection target object presence determination means determines that a detection target object is present, and when the direction in which an object is determined to be present and the distance to the object determined by the scanning measurement means do not correspond to any of the detection exclusion position information inputted by the position input means.

17. The intrusion detection sensor according to claim 16, further comprising:
a passive type infrared sensor that receives infrared rays from the detection area, and outputs an infrared detection signal indicating the presence of a detection target object in the detection area based on a temperature difference from its surroundings,
wherein the alarm signal output control means does not output the alarm signal when the infrared detection signal is not outputted from the passive type infrared sensor.

18. The intrusion detection sensor according to claim 16, wherein the two-dimensional position is a polar coordinate system defined by a direction and a distance.

19. The intrusion detection sensor according to claim 16, wherein the two-dimensional position is a rectangular coordinate system.

20. The intrusion detection sensor according to claim 16, wherein the position input means is a DIP switch.

21. The intrusion detection sensor according to claim 16, wherein the direction variable antenna device is a phased array antenna.

22. An intrusion detection sensor comprising:

a microwave sensor that transmits a plurality of types of microwaves of different frequencies toward a detection area, receives reflected waves of the respective microwaves that have been reflected off of an object present in the detection area, and outputs distance information corresponding to the distance to the object;

a direction variable antenna device that can change the direction of the plurality of types of microwaves transmitted/received from/by the microwave sensor within a predetermined range of angle;

a scanning measurement means that provides, to the direction variable antenna device, an instruction to scan the predetermined range of angle of the transmission/reception direction and monitors the distance information during the scanning so as to determine a direction in which the object is present and detected object distance information to the object;

an object movement distance recognition means that determines a movement distance per unit of time of the object based on a change in the detected object distance information over time;

a detection target object presence determination means that determines that a detection target object is present in the detection area when the movement distance per unit of time determined by the object movement distance recognition means is not less than a predetermined threshold value;

a passive type infrared sensor that receives infrared rays from the detection area, and outputs an infrared detection signal indicating the presence of a detection target object in the detection area based on a temperature difference from its surroundings;

a position storage means that stores the direction in which an object is determined to be present and the distance to the object determined by the scanning measurement means as two-dimensional detection restriction position information when the detection target object presence determination means determines that a detection target object is present, and when the infrared detection signal is not outputted from the passive type infrared sensor; and an alarm signal output control means that performs control so that an alarm signal is outputted when the detection target object presence determination means determines that a detection target object is present, and when the infrared detection signal is not outputted from the passive type infrared sensor, wherein the predetermined threshold value used by the detection target object presence determination means to determine the presence or absence of a detection target object is changed to a greater value, when the direction in which an object is determined to be present and the distance to the object determined by the scanning measurement means correspond to any of the detection restriction position information stored in the position storage means.

23. An intrusion detection sensor comprising:

a microwave sensor that transmits a plurality of types of microwaves of different frequencies toward a detection area, receives reflected waves of the respective microwaves that have been reflected off of an object present in the detection area, and outputs distance information corresponding to the distance to the object;

a direction variable antenna device that can change the direction of the plurality of types of microwaves transmitted/received from/by the microwave sensor within a predetermined range of angle;

a scanning measurement means that provides, to the direction variable antenna device, an instruction to scan the predetermined range of angle of the transmission/reception direction and monitors the distance information during the scanning so as to determine a direction in which the object is present and detected object distance information to the object;

an object movement distance recognition means that determines a movement distance per unit of time of the object based on a change in the detected object distance information over time;

a detection target object presence determination means that determines that a detection target object is present in the detection area when the movement distance per unit of time determined by the object movement distance recognition means is not less than a predetermined threshold value;

a distance input means that inputs a distance range to be excluded from the detection area as detection exclusion distance information; and an alarm signal output control means that performs control so that an alarm signal is outputted when the detection target object presence determination means determines that a detection target object is present, and when the distance to the object determined by the scanning measurement means does not correspond to any of the detection exclusion distance information inputted by the distance input means.

24. The intrusion detection sensor according to claim 23, further comprising:

a passive type infrared sensor that receives infrared rays from the detection area, and outputs an infrared detection signal indicating the presence of a detection target object in the detection area based on a temperature difference from its surroundings, wherein the alarm signal output control means does not output the alarm signal when the infrared detection signal is not outputted from the passive type infrared sensor.

* * * * *